Nov. 28, 1933.  S. GARCIA  1,937,271

REMOVABLE SAFETY BOTTLE COVER

Filed Feb. 1, 1933

INVENTOR
SERAFIN GARCIA
BY
ATTORNEY

Patented Nov. 28, 1933

1,937,271

UNITED STATES PATENT OFFICE 1,937,271

REMOVABLE SAFETY BOTTLE COVER

Serafin Garcia, Brooklyn, N. Y.

Application February 1, 1933. Serial No. 654,590

7 Claims. (Cl. 215—63)

This invention relates to new and useful improvements in a removable safety bottle cover.

The invention has for an object the construction of a removable safety bottle cover which is characterized by the provision of the cover for the bottle and having on one side a horizontal tubular member, and a member for permanent attachment around the neck of the bottle and having upwardly directed fingers extending towards each other and engaging removably into the end of said tubular member.

As a still further object of this invention it is proposed to arrange the interengagement of the fingers and the tubular member in a manner so that the permanent member for engagement around the neck of the bottle may be of varied construction.

Furthermore, as another object of this invention it is proposed to arrange the cover in a manner so that when engaged upon the neck of the bottle it may be conveniently clamped in place.

Furthermore, as another object of this invention it is proposed to provide a sleeve rotative within said tubular member and according to its position adapted to control the detachability of said pair of fingers.

This invention still further proposes the construction of an article as mentioned which is simple and durable and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
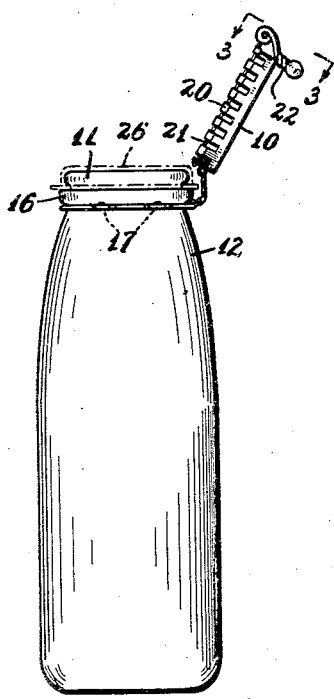
Fig. 1 is a side elevational view of a removable safety bottle cover constructed according to this invention and shown applied upon a bottle.

The removable safety bottle cover according to this invention comprises a cover 10 adapted for engaging over the neck 11 of the bottle 12 and having at one side the horizontal tubular portion 13. A member 14 for permanent engagement around the neck of the bottle 12 is provided with a pair of upwardly directed fingers 15 engaging into opposite ends of the tubular member 13 so as to pivotally support the cover 10.

The member 14 is shown in the form of a piece of wire having a circular portion for engaging around the neck of the bottle immediately below a beading 16 on the neck of the bottle so as to prevent its displacement. In order to prevent free turning of the member 14 it is provided with a plurality of bent portions 17 adapted to engage in corresponding openings in the side of the bottle 12 and thus maintain its position. The fingers 15 are formed by twisting the ends of the wire which compose the member 14 at the area 18 and thereafter arranging the fingers to the main portion of the wire and towards each other to engage into the tubular member 13.

Figure 3:
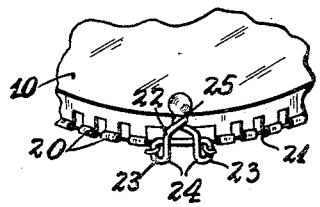
Fig. 3 is a fragmentary perspective view of a portion of the cover looking in the direction of the line 3—3 of Fig. 1.
Figure 2:
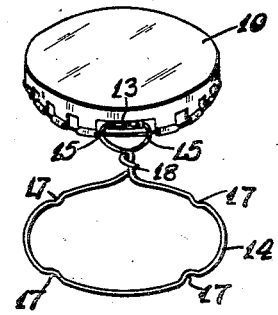
Fig. 2 is a perspective view of the removable safety bottle cover, per se.

The cover 10 is formed with the downturned edge 19 having a plurality of prongs 20 arranged at its bottom edge and curled around a wire 21 adapted in conjunction with a clamp element 22 to securely clamp the cover upon the neck of the bottle. In detail the ends of the wire 22 are turned outwards to form a pair of hooks 23 near each other. The clamping member 22 is also formed from a piece of wire and has a pair of eye portions 24 arranged in a manner so that the front sides are closer together than the rear sides clearly shown in Fig. 3. The clamping element has its ends 25 twisted to form a handle for its operation. Dot and dash lines 26 indicate the closed position of the cover upon the neck of the bottle. Further details of the clamp 22 and its operation will not be given here since its construction will readily be recognized in that it is generally known to those skilled in the art.

A means is arranged upon the tubular portion 13 adjustable and provided with lateral openings 27 so the pair of fingers 15 may pass in the act of the removing of the cover 10. In detail the tubular member 13 is formed with the lateral openings 27 extended in from the ends and a sleeve 28 is rotatively extended through the tubular member 13 and is also provided with end openings 29 adapted in one position of the sleeve to align with openings 27 to allow the passage of the fingers 15. In all other positions of the sleeve 28 the fingers 15 will be held tightly in place so that the cover cannot be removed.

Figure 4:
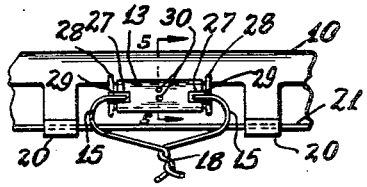
Fig. 4 is a fragmentary enlarged detailed view of a portion of Fig. 2 showing in detail the construction of the tubular and associated parts.
Figure 5:
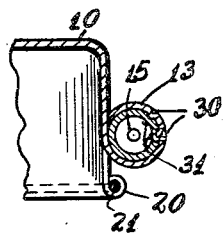
Fig. 5 is a fragmentary sectional view taken on the line 5—5 of Fig. 4.

A means is provided for frictionally holding the sleeve 28 in a position in which the cover may be removed or in a position in which it is tightly held in place. More particularly a pair of niches 30 are formed upon the sleeve member 13 and are adapted to selectively engage corresponding niche 31 formed on the sleeve 28. The ends of the sleeve 28 are flared as clearly shown in Fig. 4 so that the sleeve may be conveniently turned from one to its other position as limited by the niches 30 and 31.

Figure 6:
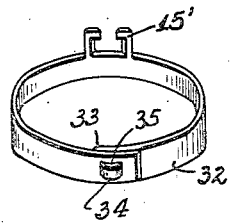
Fig. 6 is a perspective view of a modified form of member for engagement around the neck of the bottle.

In Fig. 6 a modified form of member for permanent attachment around the neck of the bottle has been disclosed. This member is stamped on sheet material and is provided with a narrow side 32 formed with upwardly directed fingers 15' extended towards each other. At the rear the sheet strip overlaps indicated by reference numerals 33 and one of the ends is formed with a hook 34 engaging through opening 35 in the other end so that the member may be permanently attached in a place upon the neck of the bottle. The fingers 15' are adapted to engage into the sleeve 28 similar to the fingers 15.

Figure 7:
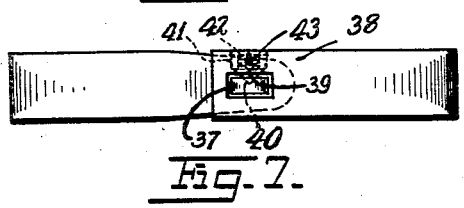
Fig. 7 is an elevational view of a further modified form of member for engagement around the neck of the bottle.

In Fig. 7 a member has been shown for permanent attachment around the neck of the bottle similar to the form previously disclosed in Fig. 6 but distinguishing in the manner of attachment of this member upon the neck of the bottle. More particularly the ends 37 and 38 of this member extend over each other and a resilient plunger 39 is mounted upon one of the ends, namely 38 and engages in an opening 40 in the other end to hold the ends together and thus secure the member in place on the neck of the bottle. The plunger 39 extends from a cavity 41 in the end 38 and a spring 42 located within this cavity normally urges the plunger outwards into engagement with the plunger 40. The plunger is provided with a head 43 by which it may be manually moved to disengage it on the opening 40 and thus cause the separation of the ends 37 and 39.

The use of the device consists in permanently attaching the member around the neck of the bottle, and then at will the cover may be detachably connected thereon. The cover is adapted to swing from the closed to the open position. It is easily removed by turning the sleeve 28 to a position in which the fingers from the permanent attached member, may pass out from the openings 27, 29.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a removable safety bottle cover, a cover for said bottle and comprising a top wall and an encircling side wall, said side wall having a portion thereof curved upwards from the bottom edge and extending outside of the outer face of the side wall forming a horizontal tubular member for coaction with a member for permanent engagement around the neck of a bottle and having an upward pair of fingers extended towards each other and engaging into the ends of said tubular member.

2. In a removable safety bottle cover, a cover for said bottle and comprising a top wall and an encircling side wall, said side wall having a portion thereof curved upwards from the bottom edge and extending outside of the outer face of the side wall forming a horizontal tubular member for coaction with a member for permanent engagement around the neck of a bottle and having an upward pair of fingers extended towards each other and engaging into the ends of said tubular member, said encircling side wall being formed with a plurality of prongs bent at the ends in the tubular portions located below said tubular member but also outside of the outer face of said side wall, and a clamp associated with the ends of said prongs for clamping the cover upon the neck of the bottle.

3. A removable safety bottle cover, comprising a cover for said bottle and having on one side a horizontal tubular member, a member for permanent engagement around the neck of a bottle and having an upward pair of fingers extended towards each other and engaging into the ends of said tubular member, and means on said horizontal tubular member adjustable to provide lateral openings through which the pair of fingers may pass to allow the removal of said cover.

4. A removable safety bottle cover, comprising a cover for said bottle and having on one side a horizontal tubular member, a member for permanent engagement around the neck of a bottle and having an upward pair of fingers extended towards each other and engaging into the ends of said tubular member, and means on said horizontal tubular member adjustable to provide lateral openings through which the pair of fingers may pass to allow the removal of said cover, said means comprising a sleeve rotative within said tubular member and end openings in said sleeve and tubular member adapted to be aligned in a certain position on said sleeve.

5. A removable safety bottle cover, comprising a cover for said bottle and having on one side a horizontal tubular member, a member for permanent engagement around the neck of a bottle and having an upward pair of fingers extended towards each other and engaging into the ends of said tubular member, and means on said horizontal tubular member adjustable to provide lateral openings through which the pair of fingers may pass to allow the removal of said cover, said means comprising a sleeve rotative within said tubular member and end openings in said sleeve and tubular member adapted to be aligned in a certain position on said sleeve, and means for holding said sleeve in said certain position.

6. A removable safety bottle cover, comprising a cover for said bottle and having on one side a horizontal tubular member, a member for permanent engagement around the neck of a bottle and having an upward pair of fingers extended towards each other and engaging into the ends of said tubular member, and means on said horizontal tubular member adjustable to provide lateral openings through which the pair of fingers may pass to allow the removal of said cover, said means comprising a sleeve rotative within said tubular member and end openings in said sleeve and tubular member adapted to be aligned in a certain position on said sleeve, and means for holding said sleeve in said certain position, comprising interengaging niches on said sleeve and tubular member.

7. A removable safety bottle cover, comprising a cover for said bottle and having on one side a horizontal tubular member, a member for permanent engagement around the neck of a bottle and having an upward pair of fingers extended towards each other and engaging into the ends of said tubular member, and means on said horizontal tubular member adjustable to provide lateral openings through which the pair of fingers may pass to allow the removal of said cover, the ends of said sleeve being flared for convenience in manual turning.

SERAFIN GARCIA.